United States Patent
Hall et al.

(10) Patent No.: US 11,602,688 B2
(45) Date of Patent: Mar. 14, 2023

(54) SYSTEMS AND METHODS OF RECIPROCATION OF GAME ASSET GIFTING

(71) Applicant: Zynga Inc., San Francisco, CA (US)

(72) Inventors: Shane Hall, San Francisco, CA (US); Dylan Sproule, San Francisco, CA (US); Ben Hall, Fairfield, CA (US); Timothy J. O. Catlin, San Mateo, CA (US); Jason Paul Allen, Seattle, WA (US); Clayton Rhodes Stark, Victoria (CA)

(73) Assignee: Zynga Inc., San Francisco, CA (US)

( * ) Notice: Subject to any disclaimer, the term of this patent is extended or adjusted under 35 U.S.C. 154(b) by 43 days.

(21) Appl. No.: 17/147,995

(22) Filed: Jan. 13, 2021

(65) Prior Publication Data

US 2021/0275917 A1    Sep. 9, 2021

Related U.S. Application Data

(63) Continuation of application No. 16/235,069, filed on Dec. 28, 2018, now Pat. No. 10,912,999, which is a
(Continued)

(51) Int. Cl.
*A63F 13/85*    (2014.01)
*A63F 13/50*    (2014.01)
(Continued)

(52) U.S. Cl.
CPC ............ *A63F 13/50* (2014.09); *A63F 13/335* (2014.09); *A63F 13/795* (2014.09); *A63F 13/85* (2014.09); *A63F 2300/609* (2013.01)

(58) Field of Classification Search
CPC ...... A63F 13/50; A63F 13/335; A63F 13/795; A63F 13/85; A63F 2300/609
See application file for complete search history.

(56) References Cited

U.S. PATENT DOCUMENTS

| | | |
|---|---|---|
| 6,390,921 B1 | 5/2002 | Busch et al. |
| 8,366,546 B1 | 2/2013 | Naik et al. |
| (Continued) | | |

FOREIGN PATENT DOCUMENTS

| | | |
|---|---|---|
| CN | 104203358 A | 12/2014 |
| WO | WO-2013/130970 A1 | 9/2013 |

OTHER PUBLICATIONS

"U.S. Appl. No. 13/782,471, Examiner Interview Summary dated Jul. 6, 2017", 3 pgs.
(Continued)

*Primary Examiner* — David L Lewis
*Assistant Examiner* — Shauna-Kay Hall
(74) *Attorney, Agent, or Firm* — Schwegman Lundberg & Woessner, P.A.

(57) ABSTRACT

A system, machine-readable storage medium storing at least one program, and a computer-implemented method for providing reciprocation of game asset gifts from a player is provided. A notification of a game asset of a first player that is available to a plurality of players is sent from a game server to the plurality of players. The notification is sent through a web feed in a game user interface of each player of the plurality of players. A first response requesting the game asset of the first player is received from a second web feed in a second game user interface of a second player in response to the notification. The game asset is provided to a second account of the second player in response to the first response.

15 Claims, 8 Drawing Sheets

Related U.S. Application Data continuation of application No. 15/922,546, filed on Mar. 15, 2018, now abandoned, which is a continuation of application No. 13/782,471, filed on Mar. 1, 2013, now Pat. No. 9,950,252.

(60) Provisional application No. 61/605,738, filed on Mar. 1, 2012.

(51) Int. Cl.
*A63F 13/795* (2014.01)
*A63F 13/335* (2014.01)

(56) References Cited

U.S. PATENT DOCUMENTS

| | | | |
|---|---|---|---|
| 8,425,323 B2* | 4/2013 | Fiden | G06Q 50/34 463/16 |
| 8,758,119 B1* | 6/2014 | Bronstein Bendayan | A63F 13/79 463/25 |
| 9,533,229 B2 | 1/2017 | Nahari et al. | |
| 9,950,252 B2 | 4/2018 | Hall et al. | |
| 10,912,999 B2 | 2/2021 | Hall et al. | |
| 2008/0040673 A1 | 2/2008 | Zuckerberg et al. | |
| 2008/0189188 A1* | 8/2008 | Morgenstern | G06Q 50/01 705/26.8 |
| 2008/0189189 A1 | 8/2008 | Morgenstern | |
| 2008/0220876 A1* | 9/2008 | Mehta | G07F 17/3281 707/E17.014 |
| 2009/0011822 A1 | 1/2009 | Englman et al. | |
| 2009/0210324 A1* | 8/2009 | Bhogal | G06Q 10/087 705/28 |
| 2009/0233494 A1* | 9/2009 | Wang | H01R 27/00 439/752.5 |
| 2009/0253494 A1* | 10/2009 | Fitch | A63F 13/12 463/25 |
| 2010/0121729 A1* | 5/2010 | Betzler | G06Q 30/06 705/26.1 |
| 2010/0130276 A1* | 5/2010 | Fiden | G06Q 50/34 463/43 |
| 2010/0227688 A1 | 9/2010 | Lee et al. | |
| 2010/0229106 A1 | 9/2010 | Lee et al. | |
| 2011/0035264 A1 | 2/2011 | Zaloom | |
| 2011/0078008 A1 | 3/2011 | Postrel | |
| 2012/0004038 A1* | 1/2012 | Van Luchene | G07F 17/3274 463/42 |
| 2012/0015733 A1 | 1/2012 | Carroll et al. | |
| 2012/0036189 A1* | 2/2012 | Sadamoto | G07F 17/32 709/204 |
| 2012/0122590 A1 | 5/2012 | Nguyen | |
| 2012/0283013 A1 | 11/2012 | Guo | |
| 2013/0210530 A1 | 8/2013 | Nguyen | |
| 2013/0231182 A1 | 9/2013 | Hall et al. | |
| 2014/0004955 A1* | 1/2014 | Nahari | A63F 13/60 463/42 |
| 2018/0200625 A1 | 7/2018 | Hall et al. | |
| 2019/0134505 A1 | 5/2019 | Hall et al. | |

OTHER PUBLICATIONS

"U.S. Appl. No. 13/782,471, Examiner Interview Summary dated Oct. 17, 2014", 4 pgs.
"U.S. Appl. No. 13/782,471, Final Office Action dated Aug. 15, 2014", 15 pgs.
"U.S. Appl. No. 13/782,471, Non Final Office Action dated Apr. 10, 2017", 8 pgs.
"U.S. Appl. No. 13/782,471, Non Final Office Action dated Oct. 18, 2013", 13 pgs.
"U.S. Appl. No. 13/782,471, Notice of Allowance dated Dec. 20, 2017", 9 pgs.
"U.S. Appl. No. 13/782,471, Response filed Sep. 11, 2017 to Non Final Office Action dated Apr. 10, 2017", 10 pgs.
"U.S. Appl. No. 13/782,471, Response filed Feb. 18, 2014 to Non-Final Office Action dated Oct. 18, 2013", 10 pgs.
"U.S. Appl. No. 15/922,546, First Action Interview—Office Action Summary dated Sep. 4, 2018", 6 pgs.
"U.S. Appl. No. 15/922,546, First Action Interview—Pre-Interview Communication dated Jun. 7, 2018", 3 pgs.
"U.S. Appl. No. 16/235,069, Non Final Office Action dated Mar. 19, 2020", 24 pgs.
"U.S. Appl. No. 16/235,069, Notice of Allowance dated Oct. 6, 2020", 10 pgs.
"U.S. Appl. No. 16/235,069, Response filed Jun. 19, 2020 to Non Final Office Action dated Mar. 19, 2020", 13 pgs.
"U.S. Appl. No. 13/782,471, Response filed Oct. 13, 2014 to Final Office Action dated Aug. 15, 2014", 10 pgs.
"International Application Serial No. PCT/US2013/028616, International Preliminary Report on Patentability dated Sep. 12, 2014", 8 pgs.
"International Application Serial No. PCT/US2013/028616, International Search Report dated May 20, 2013", 12 pgs.
"International Application Serial No. PCT/US2013/028616, Written Opinion dated May 20, 2013", 6 pgs.

* cited by examiner

SYSTEMS AND METHODS OF RECIPROCATION OF GAME ASSET GIFTING

CROSS-REFERENCE TO RELATED APPLICATIONS

This application is a continuation of U.S. patent application Ser. No. 16/235,069, filed Dec. 28, 2018, now issued as U.S. Pat. No. 10,912,999, which is a continuation of U.S. patent application Ser. No. 15/922,546, filed on Mar. 15, 2018, which is a continuation of U.S. patent application Ser. No. 13/782,471, filed on Mar. 1, 2013, now issued as U.S. Pat. No. 9,950,252, which claims a priority benefit of U.S. Provisional Application Ser. No. 61/605,738, filed on Mar. 1, 2012, which applications are incorporated herein by reference in their entireties.

TECHNICAL FIELD

The present disclosure relates to games and applications in general and in particular to computer-implemented games. In an example embodiment, a player may be given the ability to send a game asset to another player. The player receiving the game asset may be given the ability to respond to the receipt of the game asset by reciprocating another game asset.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Players of one or more computer-implemented virtual games may be provided with the ability to reciprocate the receipt of one or more in-game assets received from another player. An asset within a game may be any in-game object having a value in the game (e.g., health, money, strength, inventory, land, etc.). A player may send a request to give a game asset to another player. In response, the game networking system associated with the game may generate display data to display a notification within a web feed of a game user interface for a plurality of players. The notification may notify the plurality of players that the game asset is available to and may be acquired by the players. When a player clicks on the notification in the web feed of the player's game user interface, that player may receive the game asset (e.g., the game asset may be allocated to that player's game networking system account), and the player may use the game asset in their game play. The game user interface may also provide to the player who received the asset the ability to send any appropriate response to the player who sent the asset. Examples of the response may include a request that the players join each other's social network, a request to send another game asset back to the player who sent the first game asset, a message from the receiving player to the sending player, and the like. In some embodiments, the web feed of the game user interface displays the notification of the asset to the plurality of players in substantially real-time (e.g., when the sending player sends the request to give the asset to the other player, or immediately thereafter).

Example System

Figure 1:
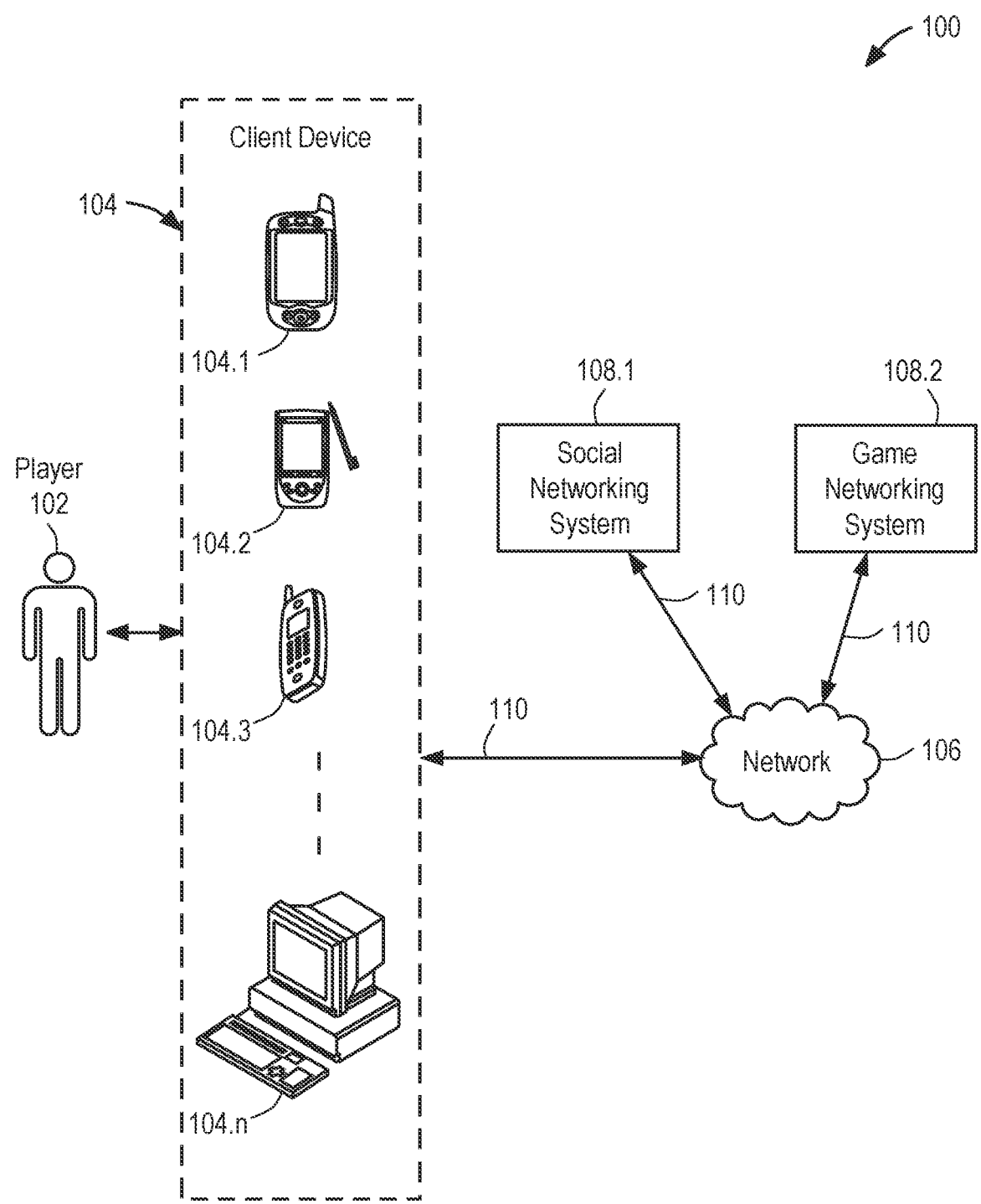
FIG. 1 is a schematic diagram showing an example of a system, according to some embodiments.

FIG. 1 is a schematic diagram showing an example of a system 100 for implementing various example embodiments. In some embodiments, the system 100 comprises a player 102, a client device 104, a network 106, a social networking system 108.1, and a game networking system 108.2. The components of the system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 104 may be any suitable computing device (e.g., devices 104.1-104.n), such as a smart phone 104.1, a personal digital assistant (PDA) 104.2, a mobile phone 104.3, a personal computer 104.n, a laptop, a computing tablet, or any other device suitable for playing a virtual game. The client device 104 may access the social networking system 108.1 or the game networking system 108.2 directly, via the network 106, or via a third-party system. For example, the client device 104 may access the game networking system 108.2 via the social networking system 108.1.

The social networking system 108.1 may include a network-addressable computing system that can host one or more social graphs 200 (see for example FIG. 2), and may be accessed by the other components of system 100 either directly or via the network 106. The social networking system 108.1 may generate, store, receive, and transmit social networking data. Moreover, the game networking system 108.2 may include a network-addressable computing system (or systems) that can host one or more virtual games, for example, online games. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the social networking system 108.1 and/or the game networking system 108.2.

Although FIG. 1 illustrates a particular example of the arrangement of the player 102, the client device 104, the social networking system 108.1, the game networking system 108.2, and the network 106, this disclosure includes any suitable arrangement or configuration of the player 102, the client device 104, the social networking system 108.1, the game networking system 108.2, and the network 106.

Figure 2:
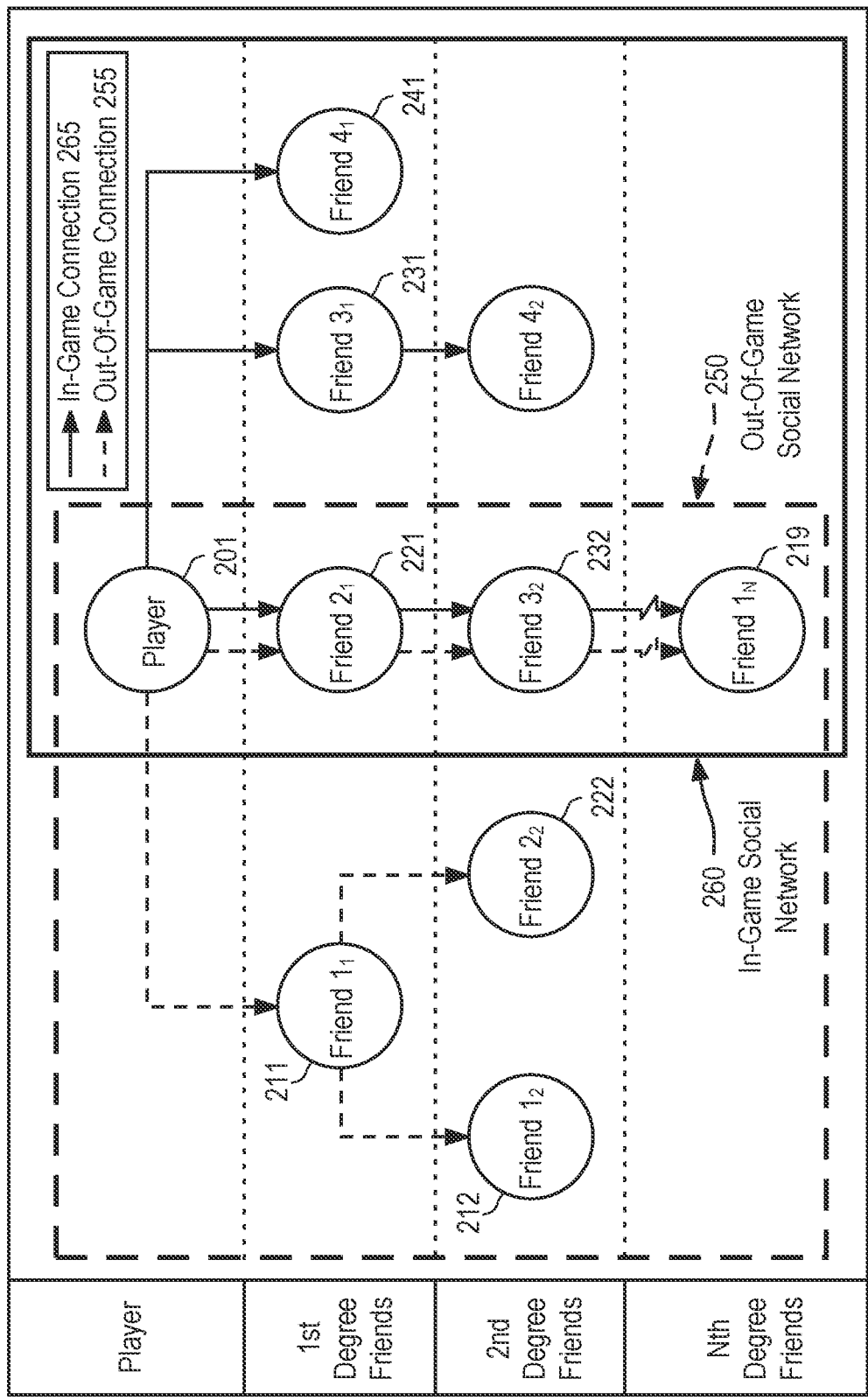
FIG. 2 is a schematic diagram showing an example of a social network within a social graph, according to some embodiments.

FIG. 2 is a schematic diagram showing an example of a social network within a social graph 200. The social graph 200 is shown by way of example to include an out-of-game social network 250, and an in-game social network 260. Moreover, in-game social network 260 may include one or more players that are friends with Player 201 (e.g., Friend 231), and may include one or more other players that are not friends with Player 201. The social graph 200 may correspond to the various players associated with one or more virtual games. In an example embodiment, each player may communicate with other players. When, for example, Player 201 initiates a transfer of a game-related asset to Friend 231, the game networking system 108.2 may perform the transfer of the game-related asset from Player 201 to Friend 231.

Example Asset Reciprocation Between Players

It is to be appreciated that the virtual game board for a game may be presented to the player in a variety of manners. In some embodiments, the game board for the game may be displayed within a game user interface on a client device of a player, and a web feed may also be displayed within the game user interface which shows ongoing game-related activities of other players that are part of the game networking system 108.2. The game user interface may be displayed within an application on the client device (e.g., browser, mobile application, etc.) and may allow a player to access and play a plurality of games hosted by the game networking system 108.2. The web feed within the game user interface may be in any form (e.g., RSS) for providing players with frequently updated content (e.g., game activity of players, notifications about assets available to players, notifications about players who need assets, incoming messages, etc.). For example, the web feed may provide a player with notifications indicating assets sent to the player from other players. In some embodiments, the game user interface may also provide the player with the ability to reciprocate the gifting of any assets received from other players by sending another game asset back to the player who sent the original game asset. In some embodiments, if the player receiving the asset is not already friends with the player who sent the asset (e.g., that player is not part of the receiving player's social network), the player who received the asset may be given the ability to send an invitation to the other player indicating that that player should join the receiving player's social network.

Figure 3:
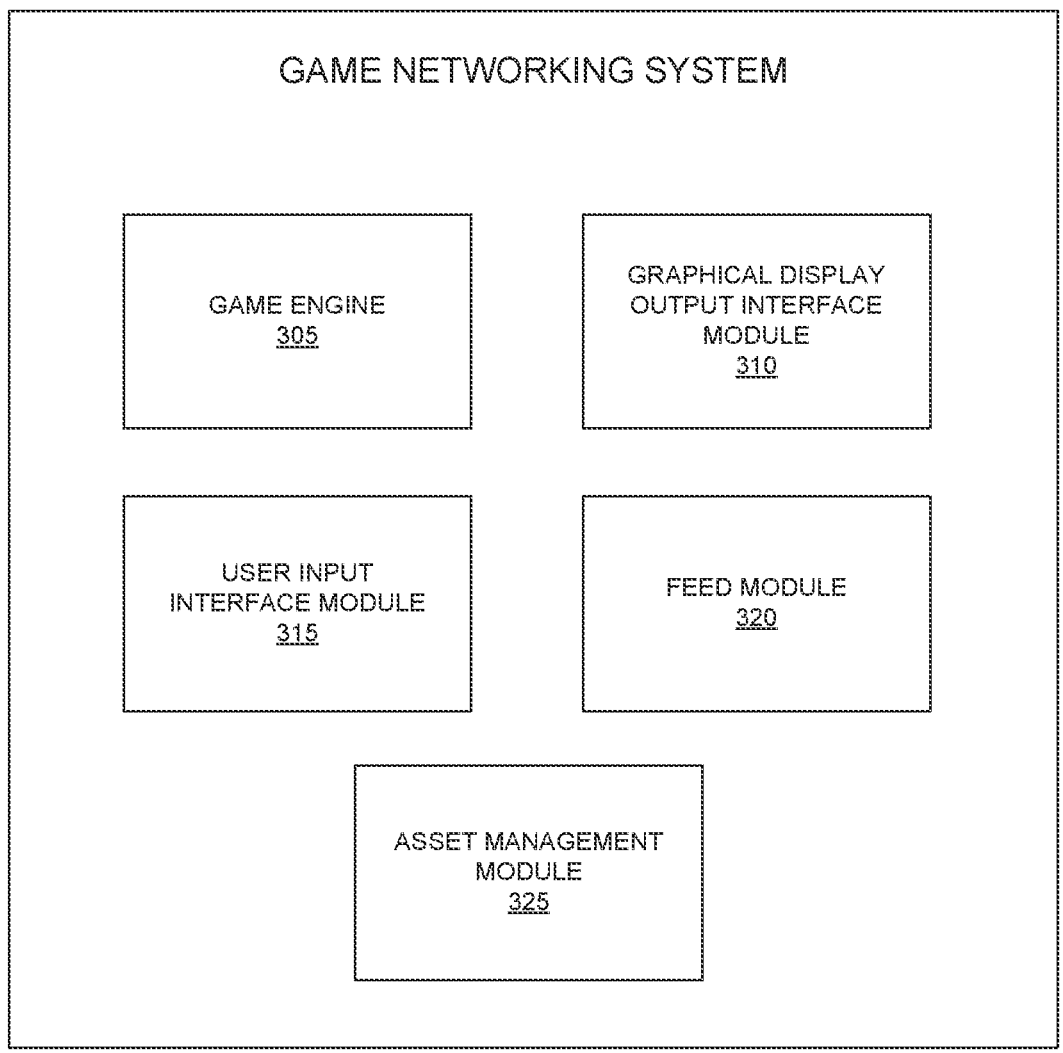
FIG. 3 is a block diagram showing example components of a game networking system, according to some embodiments.

FIG. 3 is a block diagram showing example components of a game networking system 108.2, as shown in FIG. 2. The game networking system 108.2 may include a game engine 305, a graphical display output interface module 310, a user input interface module 315, a feed module 320, and an asset management module 325.

The game engine 305 may be a hardware-implemented module which may manage and control any aspects of a game based on rules of the game, including how a game is played, players' actions and responses to players' actions, and the like. The game engine 305 may be configured to generate a game instance of a game of a player and may determine the progression of a game based on user inputs and rules of the game.

The graphical display output interface module 310 may be a hardware-implemented module that may manage and control information or data that is provided to client systems for display on a client device. For example, the graphical display output module 310 may be configured to provide display data associated with displaying a game instance of a game, displaying a game user interface associated with one or more games, displaying a web feed, and the like.

The user input interface module 315 may be a hardware-implemented module which may receive user inputs for processing by the game engine 305 based on rules of the game. For example, the user input interface module 315 may receive user inputs indicating functions, such as a move made by a player, requests to send a game asset to a player, acceptance of a game asset received from a player, requests for game assets from other players, and the like.

The feed module 320 may be a hardware-implemented module which may receive and/or pull data about game activity for one or more players of the game networking system 108.2, generate web feeds containing the game activity data received and/or pulled, and send display data to display the web feeds to one or more players of the game networking system 108.2, which may include displaying notifications associated with the gifting of assets between players. In some embodiments, the feed module 320 may provide to a player game activity data for all players who make their game activity available publicly. In some embodiments, the feed module 320 may provide to a player game activity data for all players within that player's social network. In some embodiments, if the player is offline (e.g., away from the game board), the feed module 320 may provide the player with game activity data when the player comes online (e.g., notification about which players helped with assets while the player was offline). In some embodiments, the feed module 310 may organize how feeds are displayed based on any criteria. For example, feeds for game activities of other players may be displayed based on how many times those players helped the player viewing the feed, based on the order in which game activities occurred, and the like.

The feed module 320 may generate and provide, within a web feed, notifications associated with the gifting of assets between players. For example, the feed module 320 may provide a notification of a game asset received by a player and may allow the receiving player to send a game asset back to the sending player in response. In some embodiments, the feed module 320 may also provide other relevant information, such as the name of the player sending and/or requesting an asset, a photo of the player, the asset transferred, how many times the player has helped with assets, a friend request, an option to provide a thank-you gift, a message option, and the like. In some embodiments, reciprocating a gift may provide a player with extra incentives (e.g., added energy, currency, etc.).

The asset management module 325 may be a hardware-implemented module that may manage and control information associated with assets, including managing each player's inventory of assets. The asset management module 325 may update a player's account in response to the acquisition of an asset through the web feed to reflect the acquisition. In some embodiments, when a player acquires an asset from another player, the asset management module 325 may update the receiving player's inventory to include the asset without removing the asset from the sending player's inventory. In some embodiments, when a player acquires an asset from another player, the asset management module 325 may update the receiving player's inventor to include the asset and may remove the asset from the sending player's inventory.

Figure 4:
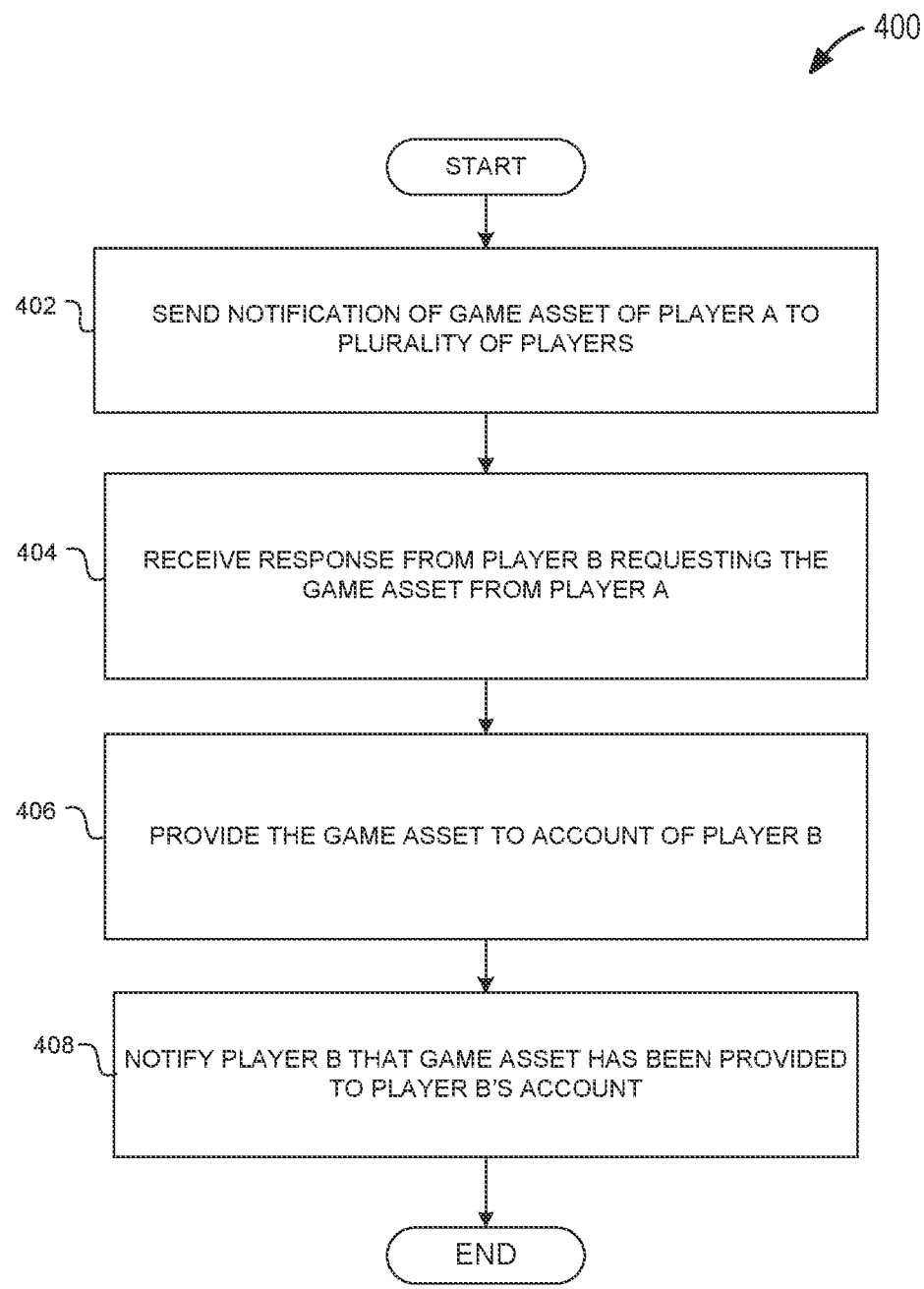
FIG. 4 is a flowchart showing an example method of providing a game asset of one player to another player, according to some embodiments.

FIG. 4 is a flowchart showing an example method 400 of providing a game asset of one player to another player. The method 400 may be performed by the game networking system 108.2 shown in FIG. 3 and provides an example of gifting a game asset belonging to Player A to Player B.

In operation 402, the feed module 320 may send a notification of a game asset of Player A to a plurality of players. The notification of the available game asset may be sent to a plurality of players through a web feed in the game user interface used by each of the players to access games hosted by the game networking system 108.2. The game asset may be associated with one or more of the computer-implemented games hosted by the game networking system 108.2. In some embodiments, the notification of the game asset of Player B may be sent to the plurality of players in response to Player A sending a request to gift the game asset to at least one of the plurality of players. The notification may be sent to any players associated with the game networking system 108.2 (e.g., all players of the game networking system 108.2, players within Player A's social network, players that have characteristics in common with Player A, players who need the particular asset being offered, etc.).

In operation 404, user input interface module 315 may receive a response from Player B requesting the game asset from Player A. The response may be received in response to the notification sent to the web feed of Player B's game user interface. The response may be received from Player B in any manner. For example, Player B may click on the notification in the web feed (or on a portion of or a button in the notification in the web feed), which may send the response to the user input interface module 315.

In operation 406, the asset management module 325 may provide the game asset to Player B's account when the response is received from Player B at the user input interface module 315. In some embodiments, the game asset may be included in Player B's account without removing the asset from Player A's account. In some embodiments, the game asset may be provided to a predefined number of players or for a predefined transfer number threshold without removing the asset from Player A's account. In other words, the transferred asset may be removed from Player A's account after Player A has transferred the asset over the predefined transfer number threshold. In some embodiments, the predefined number of players or the predefined transfer number threshold may be measured within a game session or a predefined time threshold such (e.g., Player A can transfer item X to Y number of players within a day without having item X removed from Player A's account). In some embodiments, the game asset may be included in Player B's account and removed from Player A's account. Similarly, predefined conditions such as the one previously described can be included as a condition to removing the game asset from Player A's account.

In operation 408, the feed module 320 may notify Player B that the game asset was provided to Player B's account. The notification may be provided to the game user interface of Player B in any appropriate manner, such as through the web feed in the game user interface for Player B, through a window of the game user interface of Player B, and the like.

Figure 5A:
FIGS. 5A-5C are interface diagrams illustrating example game user interfaces to reciprocate the receipt of a game asset, according to some embodiments.
Figure 5B:
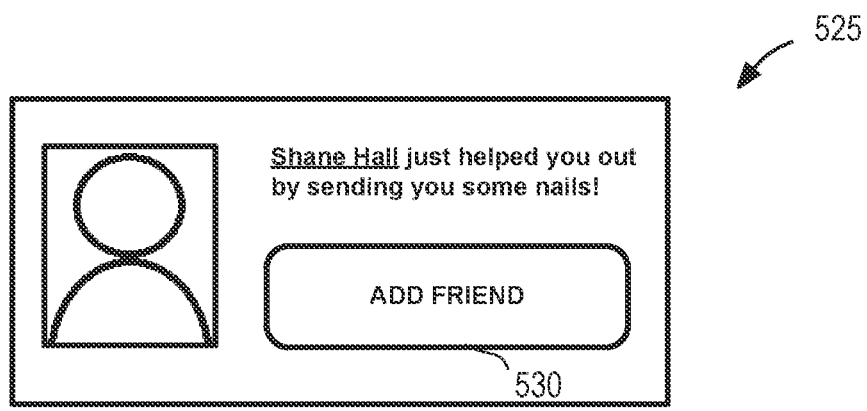
Figure 5C:
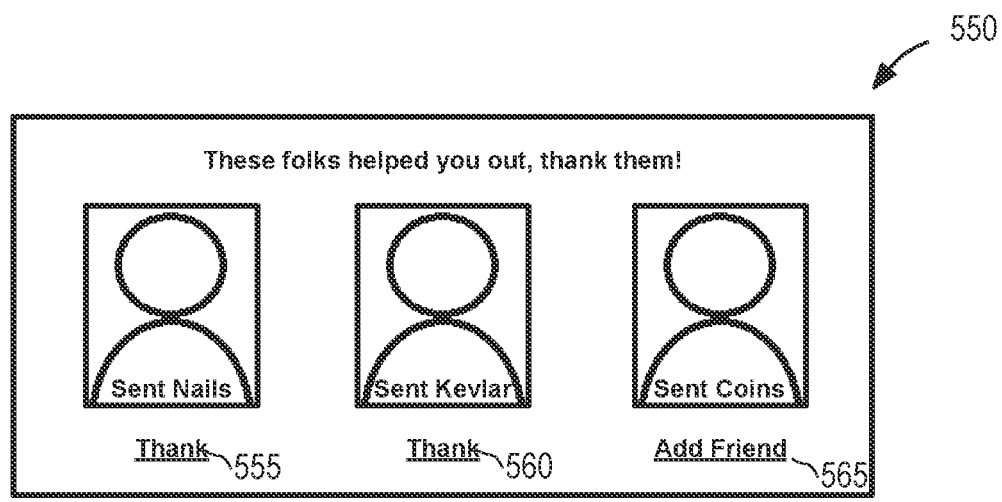

Additionally, Player B's game user interface may provide a notification to Player B notifying Player B of an opportunity to reciprocate the game asset gift from Player A. FIGS. 5A-5C are interface diagrams illustrating example game user interfaces 500, 525, and 550 to reciprocate the receipt of a game asset. The game user interface 500 of FIG. 5A may be provided to a player in any appropriate manner, such as being provided as part of a web feed displayed to a player to show game activities of other players, as a window that pops up from the game user interface for playing the game, and the like. In the example of FIG. 5A, the game user interface 500 may show a notification indicating that Player A ("Shane Hall") gave Player B game assets (e.g., nails). The game user interface 500 may also allow Player B to reciprocate the gift of nails by sending another game asset using the "Send a Thank You Gift" button 505 on the user interface 500.

The example game user interface 525 of FIG. 5B may also be provided to a player in any appropriate manner, such as being provided as part of a web feed displayed to a player to show game activities of other players, as a window that pops up from the game user interface for playing the game, and the like. In the example of FIG. 5B, the game user interface 525 may show a notification indicating that Player A ("Shane Hall") gave Player B game assets (e.g., nails). The game user interface 525 may also allow Player B to add Player A as a friend (e.g., a player that is part of that Player B's social network) using the "Add Friend" button 530 on the user interface 525 if Player B is outside of Player A's social network.

The example game user interface 550 of FIG. 5C may also be provided to a player in any appropriate manner, such as being provided as part of a web feed displayed to a player to show game activities of other players, as a window that pops up from the game user interface for playing the game, and the like. In the example of FIG. 5C, the game user interface 550 may show a notification indicating players that have helped Player B with game assets. The game user interface 550 may also allow Player B to add the sending players as a friend (e.g., a player that is part of Player B's social network) using the "Add Friend" link 565 on the user interface 550 or allow Player B to reciprocate the gift received by sending another game asset using the "Thank" links 555 and 560 on the user interface 550. In some embodiments, game user interface 550 may be depicted as a summary of assets received while Player B was offline.

Figure 6:
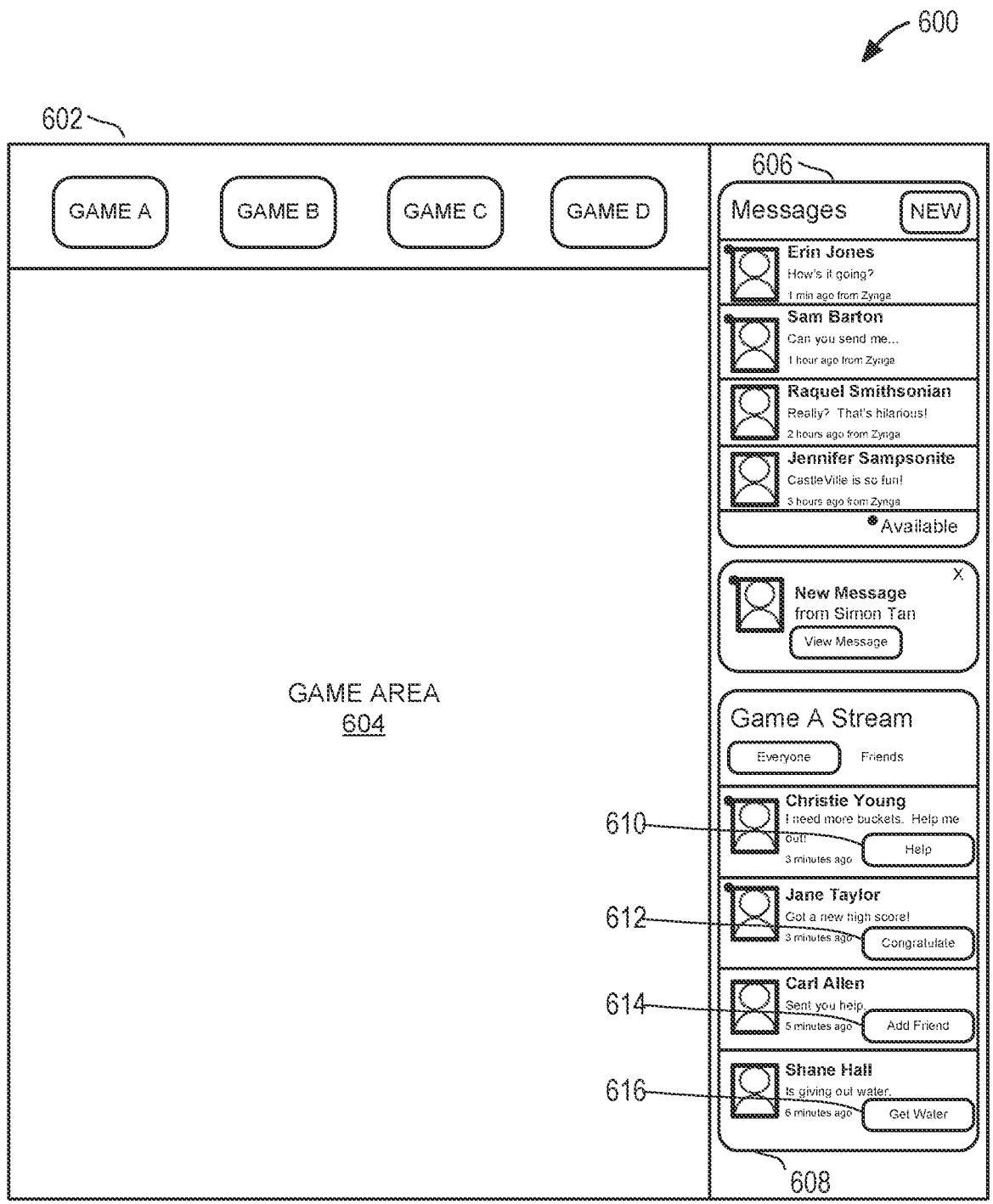
FIG. 6 is an interface diagram illustrating an example game user interface to receive and send game assets, according to some embodiments.

FIG. 6 is an interface diagram illustrating an example game user interface 600 to play a game (e.g., Game A) and to receive and send game assets. The game user interface 600 may be a game user interface for a particular player (e.g., Player A) and may allow that player to play any one of a plurality of games hosted by the game networking system 108.2. The game user interface 600 includes a game icon portion 602, which includes icons associated with games (e.g., Games A-D) that Player A may choose to play using the game user interface 600. The game user interface 600 may also include a game area 604, which may be the portion of the game user interface 600 on which a particular computer-implemented game is displayed (e.g., a game board for Game A being played by Player A).

The game user interface 600 may further include a message portion 606 for displaying messages received from other players. The message portion 606 may display the messages received in any format (e.g., RSS feed, inbox-style list of messages received, etc.). The message portion 606 may also allow Player A to create and send a new message to another player.

The game user interface 600 may also include a web feed portion 608 displaying game activity data of other players. The web feed portion 608 may provide notifications of assets received by Player A from other players and assets requested by other players and may provide an ability to send a response to a player who sent an asset to Player A. The notifications may be received in the web feed portion in any manner (e.g., RSS web feed). For example, the web feed portion 608 may display the notifications in substantially real-time (e.g., when the activity identified in the notification occurs, or immediately thereafter, etc.). The web feed portion 608 may display activities occurring for all players associated with the game networking system 108.2, for players that are part of Player A's social network, and the like.

In the example of FIG. 6, a notification may be provided in the web feed portion 608 which indicates that Christie Young needs more bucket assets for her game, and Player A may help Christie Young by clicking on the "Help" button 610 in the notification. If player A clicks on the "Help" button 610, a bucket asset may be provided to Christie Young's game account. In some embodiments, clicking on the "Help" button 610 may result in a bucket asset being removed from Player A's game account. In some embodiments, the bucket asset may be sent to Christie Young's account without removing the bucket asset from Player A's game account. The notification requesting a bucket asset may have been sent to a plurality of players, including Player A. For example, the notification may be sent to all players associated with the game networking system 108.2 that play a particular game that uses the bucket game asset, to players who are friends with Christie Young, and the like. If Player A clicks on the "Help" button 610, Player A may receive a notification that help was sent to Christie Young, and Christie Young may receive a notification that help was received from Player A.

In another example, a notification indicating that Jane Taylor received a new high score in a game may be provided to Player A in the web feed portion 608. Player A may use the "Congratulate" button 612 in the notification to send any appropriate form of congratulations to Jane Taylor (e.g., an asset gift, a message, etc.). If Player A clicks on the "Congratulate" button 612, Player A may receive a notification that a form of congratulations was sent to Jane Taylor, and Jane Taylor may receive a notification that the form of congratulations was received from Player A.

In another example, a notification indicating that Carl Allen sent Player A help may be provided to Player A in the web feed portion 608. Player A may reciprocate the help that was given by Carl Allen by clicking on the "Add Friend" button 614, which may add Carl Allen to Player A's social network. If Player A clicks on the "Add Friend" button 614, Player A may receive a notification that a friend request was sent to Carl Allen, and Carl Allen may receive a notification that the friend request was received from Player A.

In another example, a notification indicating that Shane Hall is giving out a water asset may be provided to Player A in the web feed portion 608. Player A may choose to acquire the asset being offered by Shane Hall by clicking on the "Get Water" button 616, which may add the water asset to Player A's game account. If Player A clicks on the "Get Water" button 616, Player A may receive a notification that the water asset was received from Shane Hall, and Shane Hall may receive a notification that the water asset was acquired by Player A.

Storing Game-Related Data

A database may store any data relating to game play within a game networking system 108.2. The database may include database tables for storing a player game state that may include information about the player's virtual game board, the player's character, or other game-related information. For example, player game state may include virtual objects owned or used by the player, placement positions for virtual structural objects in the player's virtual game board, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 108.2 may determine the player's friend preferences based on player attributes that the player's first-degree friends have in common, and may store these player attributes as friend preferences in the player profile. Furthermore, the game networking system 108.2 may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 108.2 may determine the player's likelihood to lead value based on information from other players that interact with this player. For example, the game networking system 108.2 may determine the player's likelihood to lead value by measuring the other players' satisfaction in the virtual game, measuring their satisfaction from their interaction with the player, measuring the gameplay frequency for the other players in relation to their interaction frequency with the player (e.g., the ability for the player to retain others), and/or the like.

The game networking system 108.2 may also determine the player's likelihood to lead value based on information about the player's interactions with others and the outcome of these interactions. For example, the game networking system 108.2 may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 108.2 may determine the player's likelihood to lead value based on determining a likelihood for the other players to perform a certain action in response to interacting or communicating with the player and/or the player's virtual environment.

Example Game Systems, Social Networks, and Social Graphs

In a multiplayer game, players control player characters (PCs), a game engine controls non-player characters (NPCs), and the game engine also manages player character state and tracks states for currently active (e.g., online) players and currently inactive (e.g., offline) players. A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a player (or a group of more than one players), the game engine may take into account the state of the player character (or group of PCs) that is playing, but also the state of one or more PCs of offline/inactive players who are connected to the current player (or PC, or group of PCs) through the game social graph but are not necessarily involved in the game at the time.

For example, Player A with six friends on Player A's team (e.g., the friends that are listed as being in the player's mob/gang/set/army/business/crew/etc. depending on the nature of the game) may be playing the virtual game and choose to confront Player B who has 20 friends on Player B's team. In some embodiments, a player may only have first-degree friends on the player's team. In other embodiments, a player may also have second-degree and higher degree friends on the player's team. To resolve the game event, in some embodiments the game engine may total up the weapon strength of the seven members of Player A's team and the weapon strength of the 21 members of Player B's team and decide an outcome of the confrontation based on a random variable applied to a probability distribution that favors the side with the greater total. In some embodiments, all of this may be done without any other current active participants other than Player A (e.g., Player A's friends, Player, B, and Player B's friends could all be offline or inactive). In some embodiments, the friends in a player's team may see a change in their state as part of the outcome of the game event. In some embodiments, the state (assets, condition, level) of friends beyond the first degree are taken into account.

Example Game Networking Systems

A virtual game may be hosted by the game networking system 108.2, which can be accessed using any suitable connection 110 with a suitable client device 104. A player may have a game account on the game networking system 108.2, wherein the game account may contain a variety of information associated with the player (e.g., the player's personal information, financial information, purchase history, player character state, game state, etc.). In some embodiments, a player may play multiple games on the game networking system 108.2, which may maintain a single game account for the player with respect to the multiple games, or multiple individual game accounts for each game with respect to the player. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the client device 104, and/or by the player 102 logging onto the virtual game.

In some embodiments, the player 102 accesses a virtual game and control the game's progress via the client device 104 (e.g., by inputting commands to the game at the client device 104). The client device 104 can display the game interface, receive inputs from the player 102, transmit user inputs or other events to the game engine, and receive instructions from the game engine. The game engine can be executed on any suitable system (such as, for example, the client device 104, the social networking system 108.1, or the game networking system 108.2). For example, the client device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the client device 104. As another example, when the player 102 provides an input to the game through the client device 104 (such as, for example, by typing on the keyboard or clicking the mouse of the client device 104), the client components of the game may transmit the player's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific players. A game instance is associated with a specific player when one or more game parameters of the game instance are associated with the specific player. For example, a game instance associated with a first player may be named "First Player's Play Area." This game instance may be populated with the first player's PC and one or more in-game objects associated with the first player.

In some embodiments, a game instance associated with a specific player is only accessible by that specific player. For example, a first player may access a first game instance when playing a virtual game, and this first game instance may be inaccessible to all other players. In other embodiments, a game instance associated with a specific player is accessible by one or more other players, either synchronously or asynchronously with the specific player's game play. For example, a first player may be associated with a first game instance, but the first game instance may be accessed by all first-degree friends in the first player's social network.

In some embodiments, the set of in-game actions available to a specific player is different in a game instance that is associated with this player compared to a game instance that is not associated with this player. The set of in-game actions available to a specific player in a game instance associated with this player may be a subset, superset, or independent of the set of in-game actions available to this player in a game instance that is not associated with him. For example, a first player may be associated with Blackacre Farm in an online farming game, and may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In some embodiments, a game engine interfaces with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a player or player character in a multiplayer game.

In some embodiments, the social graph is managed by the game networking system 108.2, which is managed by the game operator. In other embodiments, the social graph is part of a social networking system 108.1 managed by a third party (e.g., Facebook, Friendster, Myspace, Yahoo). In yet other embodiments, the player 102 has a social network on both the game networking system 108.2 and the social networking system 108.1, wherein the player 102 can have a social network on the game networking system 108.2 that is a subset, superset, or independent of the player's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Example Systems and Methods

Returning to FIG. 2, the Player 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to Player 201. As used herein, the terms "player" and "user" can be used interchangeably and can refer to any user in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a player to another user is considered the degree of separation. For example, FIG. 2 shows that Player 201 has three second-degree friends to which Player 201 is connected via Player 201's connection to Player 201's first-degree friends. Second-degree Friend $1_2$ 212 and Friend $2_2$ 222 are connected to Player 201 via Player 201's first-degree Friend $1_1$ 211. The limit on the depth of friend connections, or the number of degrees of separation for associations, that Player 201 is allowed is typically dictated by the restrictions and policies implemented by the social networking system 108.1.

In various embodiments, Player 201 can have Nth-degree friends connected to him through a chain of intermediary degree friends as indicated in FIG. 2. For example, Nth-degree Friend $1_N$ 219 is connected to Player 201 within in-game social network 260 via second-degree Friend $3_2$ 232 and one or more other higher-degree friends.

In some embodiments, a player (or player character) has a social graph within a multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in Player 201's out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in Player 201's in-game social network 260. In some embodiments, a game engine can access in-game social network 260, out-of-game social network 250, or both.

In some embodiments, the connections in a player's in-game social network is formed both explicitly (e.g., when users "friend" each other) and implicitly (e.g., when the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (e.g., in disintermediated interactions or the like), but that could be the case.

Figure 7:
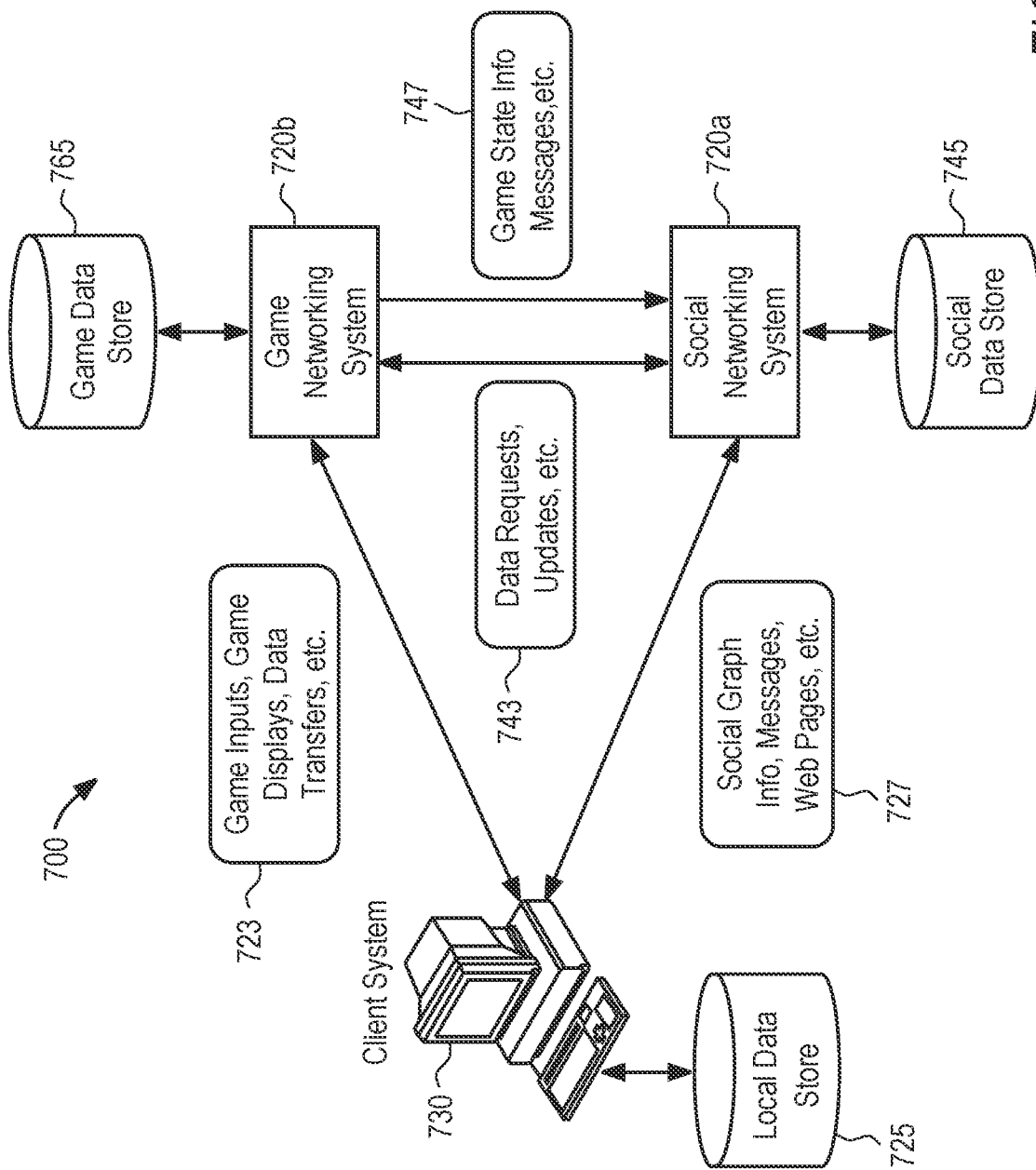
FIG. 7 is a diagrammatic representation of an example data flow between example components of the example system of FIG. 1, according to some embodiments.

FIG. 7 is a diagrammatic representation of an example data flow between example components of an example system 700. One or more of the components of the example system 700 may correspond to one or more of the components of the example system 100. In some embodiments, system 700 includes a client system 730, a social networking system 720a, and a game networking system 720b. The components of system 700 can be connected to each other in any suitable configuration, using any suitable type of connection. The components may be connected directly or over any suitable network. The client system 730, the social networking system 720a, and the game networking system 720b may have one or more corresponding data stores such as the local data store 725, the social data store 745, and the game data store 765, respectively.

The client system 730 may receive and transmit data 723 to and from the game networking system 720b. This data 723 can include, for example, a web page, a message, a game input, a game display, a HTTP packet, a data request, transaction information, and other suitable data. At some other time, or at the same time, the game networking system 720b may communicate data 743, 747 (e.g., game state information, game system account information, page info, messages, data requests, updates, etc.) with other networking systems, such as the social networking system 720a (e.g., FACEBOOK, MYSPACE, etc.). The client system 730 can also receive and transmit data 727 to and from the social networking system 720a. This data can include, for example, web pages, messages, social graph information, social network displays, HTTP packets, data requests, transaction information, updates, and other suitable data.

Communication between the client system 730, the social networking system 720a, and the game networking system 720b can occur over any appropriate electronic communication medium or network using any suitable communications protocols. For example, the client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a player accesses a virtual game on the game networking system 720b, the BLOB containing the game state for the instance corresponding to the player may be transmitted to the client system 730 for use by a client-side executed object to process. In some embodiments, the client-side executable is a FLASH™-based game, which can de-serialize the game state data in the BLOB. As a player plays the game, the game logic implemented at the client system 730 maintains and modifies the various game state parameters locally. The client-side game logic may also batch game events, such as mouse clicks, and transmit these events to the game networking system 720b. Game networking system 720b may itself operate by retrieving a copy of the BLOB from a database or an intermediate memory cache (memcache) layer. The game networking system 720b can also de-serialize the BLOB to resolve the game state parameters and execute its own game logic based on the events in the batch file of events transmitted by the client to synchronize the game state on the server side. The game networking system 720b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a player selects one or more actions to perform. The web pages may be displayed in a browser client executed on the client system 730. For example, a client application downloaded to the client system 730 may operate to serve a set of web pages to a player. As another example, a virtual game may be an animated or rendered game executable as a stand-alone application or within the context of a webpage or other structured document. In some embodiments, the virtual game is implemented using ADOBE™ FLASH™-based technologies. As an example, a game may be fully or partially implemented as a SWF object that is embedded in a web page and executable by a FLASH™ media player plug-in. In some embodiments, one or more described web pages is associated with or accessed by the social networking system 720a. This disclosure contemplates using any suitable application for the retrieval and rendering of structured documents hosted by any suitable network-addressable resource or website.

Application event data of a game is any data relevant to the game (e.g., player inputs). In some embodiments, each application datum may have a name and a value, and the value of the application datum may change (e.g., be updated) at any time. When an update to an application datum occurs at the client system 730, either caused by an action of a game player or by the game logic itself, the client system 730 may need to inform the game networking system 720b of the update. For example, if the game is a farming game with a harvest mechanic (such as ZYNGA™ FARMVILLE™), an event can correspond to a player clicking on a parcel of land to harvest a crop. In such an instance, the application event data may identify an event or action (e.g., harvest) and an object in the game to which the event or action applies.

In some embodiments, one or more objects of a game may be represented as any one of an ADOBE™ FLASH™ object, MICROSOFT™ SILVERLIGHT™ object, HTML 5 object, etc. FLASH™ may manipulate vector and raster graphics, and supports bidirectional streaming of audio and video. "FLASH™" may mean the authoring environment, the player, or the application files. In some embodiments, the client system 730 may include a FLASH™ client. The FLASH™ client may be configured to receive and run FLASH™ application or game object code from any suitable networking system (such as, for example, the social networking system 720*a* or the game networking system 720*b*). In some embodiments, the FLASH™ client is run in a browser client executed on the client system 730. A player can interact with FLASH™ objects using the client system 730 and the FLASH™ client. The FLASH™ objects can represent a variety of in-game objects. Thus, the player may perform various in-game actions on various in-game objects by making various changes and updates to the associated FLASH™ objects.

In some embodiments, in-game actions are initiated by clicking or similarly interacting with a FLASH™ object that represents a particular in-game object. For example, a player can interact with a FLASH™ object to use, move, rotate, delete, attack, shoot, or harvest an in-game object. This disclosure contemplates performing any suitable in-game action by interacting with any suitable FLASH™ object. In some embodiments, when the player makes a change to a FLASH™ object representing an in-game object, the client-executed game logic may update one or more game state parameters associated with the in-game object. To ensure synchronization between the FLASH™ object shown to the player at the client system 730, the FLASH™ client may send the events that caused the game state changes to the in-game object to the game networking system 720*b*. However, to expedite the processing and hence the speed of the overall gaming experience, the FLASH™ client may collect a batch of some number of events or updates into a batch file. The number of events or updates may be determined by the FLASH™ client dynamically or determined by the game networking system 720*b* based on server loads or other factors. For example, client system 730 may send a batch file to the game networking system 720*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to player data or metadata, changes to player social connections or contacts, player inputs to the game, and events generated by the game logic. In some embodiments, each application datum has a name and a value. The value of an application datum may change at any time in response to the game play of a player or in response to the game engine (e.g., based on the game logic). In some embodiments, an application data update occurs when the value of a specific application datum is changed.

In some embodiments, when a player plays a virtual game on the client system 730, the game networking system 720*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular player and a particular virtual game. In some embodiments, while a player is not playing the virtual game, the corresponding BLOB may be stored in the database. This enables a player to stop playing the game at any time without losing the current state of the game the player is in. When a player resumes playing the game next time, game networking system 720*b* may retrieve the corresponding BLOB from the database to determine the most-recent values of the game-related data. In some embodiments, while a player is playing the virtual game, the game networking system 720*b* also loads the corresponding BLOB into a memory cache so that the game system may have faster access to the BLOB and the game-related data contained therein.

Figure 8:
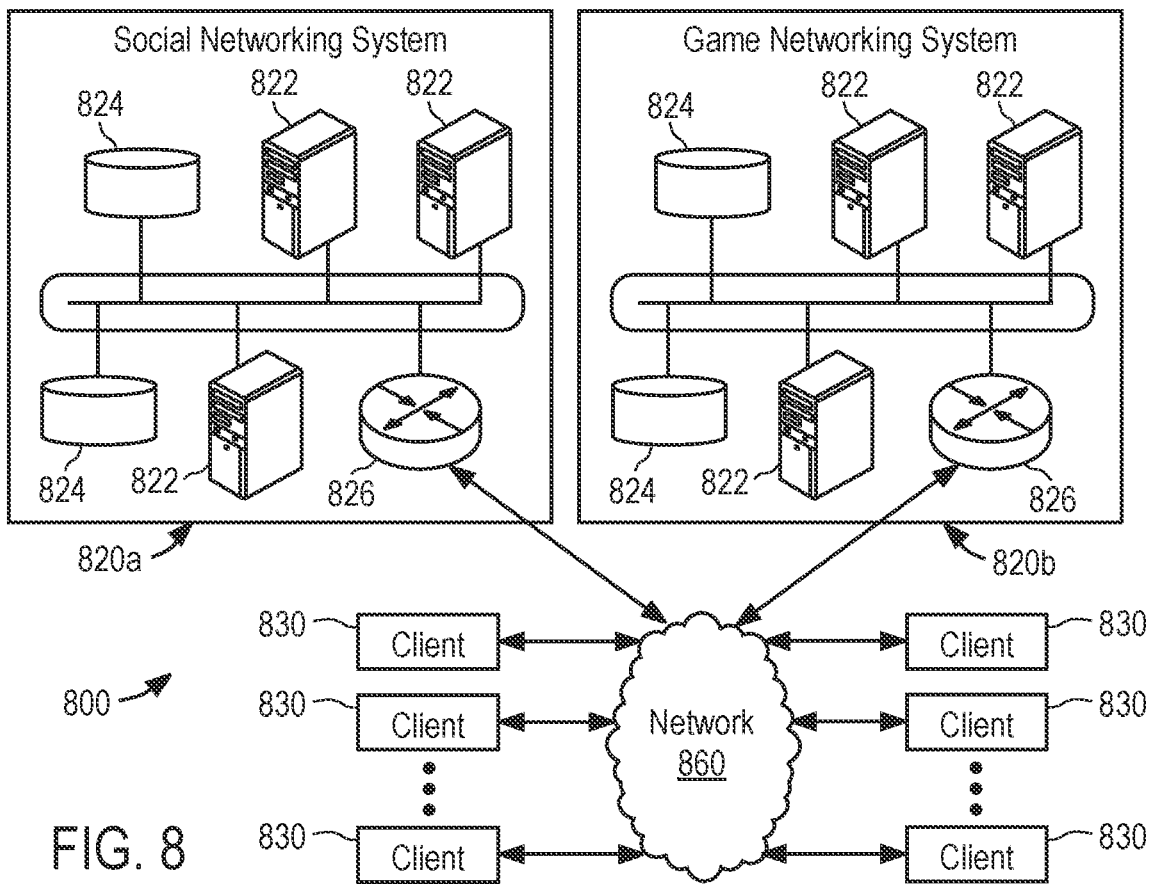
FIG. 8 is a schematic diagram showing an example network environment, in which various example embodiments may operate, according to some embodiments.

Various embodiments may operate in a wide area network environment, such as the Internet, including multiple network addressable systems. FIG. 8 is a schematic diagram showing an example network environment 800, in which various example embodiments may operate. Network cloud 860 generally represents one or more interconnected networks, over which the systems and hosts described herein can communicate. Network cloud 860 may include packet-based wide area networks (such as the Internet), private networks, wireless networks, satellite networks, cellular networks, paging networks, and the like. As FIG. 8 illustrates, various embodiments may operate in a network environment 800 comprising one or more networking systems, such as a social networking system 820*a*, a game networking system 820*b*, and one or more client systems 830. The components of the social networking system 820*a* and the game networking system 820*b* operate analogously; as such, hereinafter they may be referred to simply as the networking system 820. The client systems 830 are operably connected to the network environment 800 via a network service provider, a wireless carrier, or any other suitable means.

The networking system 820 is a network addressable system that, in various example embodiments, comprises one or more physical servers 822 and data stores 824. The one or more physical servers 822 are operably connected to computer network cloud 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), FLASH™, ActionScript, and the like.

The physical servers 822 may host functionality directed to the operations of the networking system 820. Hereinafter servers 822 may be referred to as server 822, although the server 822 may include numerous servers hosting, for example, the networking system 820, as well as other content distribution servers, data stores, and databases. Data store 824 may store content and data relating to, and enabling, operation of, the networking system 820 as digital data objects. A data object, in some embodiments, is an item of digital information typically stored or embodied in a data file, database, or record. Content objects may take many forms, including: text (e.g., ASCII, SGML, HTML), images (e.g., JPEG, TIF and GIF), graphics (vector-based or bitmap), audio, video (e.g., MPEG), or other multimedia, and combinations thereof. Content object data may also include executable code objects (e.g., games executable within a browser window or frame), podcasts, etc.

Logically, data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In some embodiments, data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. Data store 824 may include data associated with different networking system 820 users and/or client systems 830.

The client system 830 is generally a computer or computing device including functionality for communicating (e.g., remotely) over a computer network. The client system 830 may be a desktop computer, laptop computer, PDA, in- or out-of-car navigation system, smart phone or other cellular or mobile phone, or mobile gaming device, among other suitable computing devices. Client system 830 may execute one or more client applications, such as a Web browser.

When a user at a client system 830 desires to view a particular webpage (hereinafter also referred to as target structured document) hosted by the networking system 820, the user's web browser, or other document rendering engine or suitable client application, formulates and transmits a request to the networking system 820. The request generally includes a URL or other document identifier as well as metadata or other information. By way of example, the request may include information identifying the user, a timestamp identifying when the request was transmitted, and/or location information identifying a geographic location of the user's client system 830 or a logical network location of the user's client system 830.

Although the example network environment 800 described above and illustrated in FIG. 8 is described with respect to the social networking system 820a and the game networking system 820b, this disclosure encompasses any suitable network environment using any suitable systems. For example, a network environment may include online media systems, online reviewing systems, online search engines, online advertising systems, or any combination of two or more such systems.

Figure 9:
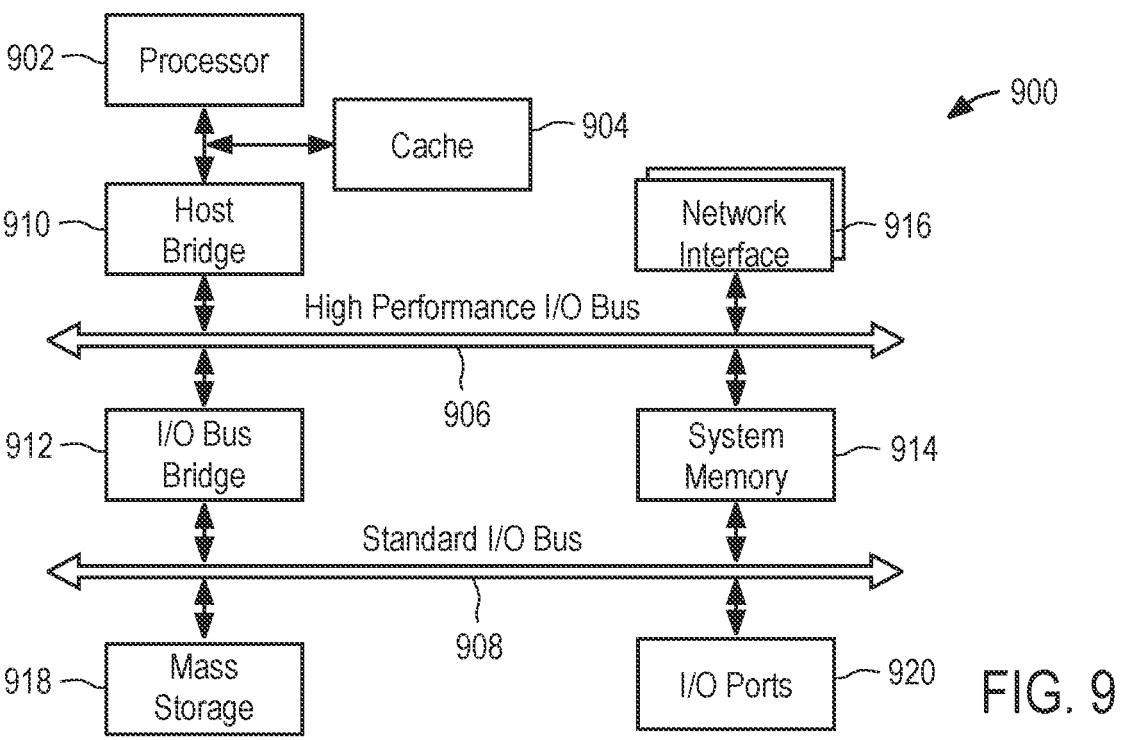
FIG. 9 is a block diagram illustrating an example computing system architecture, which may be used to implement one or more of the methodologies described herein, according to some embodiments.

FIG. 9 is a block diagram illustrating an example computing system architecture, which may be used to implement a server 822 or a client system 830. In one embodiment, the hardware system 900 comprises a processor 902, a cache memory 904, and one or more executable modules and drivers, stored on a tangible computer-readable storage medium, directed to the functions described herein. Additionally, the hardware system 900 may include a high performance input/output (I/O) bus 906 and a standard I/O bus 908. A host bridge 910 may couple the processor 902 to the high performance I/O bus 906, whereas the I/O bus bridge 912 couples the two buses 906 and 908 to each other. A system memory 914 and one or more network/communication interfaces 916 may couple to the bus 906. The hardware system 900 may further include video memory (not shown) and a display device coupled to the video memory. Mass storage 918 and I/O ports 920 may couple to the bus 908. The hardware system 900 may optionally include a keyboard, a pointing device, and a display device (not shown) coupled to the bus 908. Collectively, these elements are intended to represent a broad category of computer hardware systems.

The elements of the hardware system 900 are described in greater detail below. In particular, the network interface 916 provides communication between the hardware system 900 and any of a wide range of networks, such as an Ethernet (e.g., IEEE 802.3) network, a backplane, etc. The mass storage 918 provides permanent storage for the data and programming instructions to perform the above-described functions implemented in servers 822 of FIG. 8, whereas system memory 914 (e.g., DRAM) provides temporary storage for the data and programming instructions when executed by the processor 902. I/O ports 920 are one or more serial and/or parallel communication ports that provide communication between additional peripheral devices, which may be coupled to the hardware system 900.

The hardware system 900 may include a variety of system architectures and various components of the hardware system 900 may be rearranged. For example, cache memory 904 may be on-chip with the processor 902. Alternatively, the cache memory 904 and the processor 902 may be packed together as a "processor module," with processor 902 being referred to as the "processor core." Furthermore, certain embodiments of the present disclosure may neither require nor include all of the above components. For example, the peripheral devices shown coupled to the standard I/O bus 908 may couple to the high performance I/O bus 906. In addition, in some embodiments, only a single bus may exist, with the components of the hardware system 900 being coupled to the single bus. Furthermore, the hardware system 900 may include additional components, such as additional processors, storage devices, or memories.

An operating system manages and controls the operation of the hardware system 900, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
   at a server system supporting a gaming platform for a computer-implemented online game, managing respective game state data for multiple players who access the game via a game interface generated on a respectively associated client device for each player, the game state data including, for each player, a respective asset inventory that indicates game assets available to the respective player during gameplay;

as a result of a preceding non-gameplay interaction between a first player and a second player via the game interface of the first player, providing to the first player a received asset sourced from the second player, the asset inventory of the first player being updated to include therein the received asset and the asset inventory of the second player being updated to remove therefrom the received asset, so that the received asset is effectively transferred from the asset inventory of the second player to the asset inventory of the first player, wherein removal of the received asset from the asset inventory of the second player is in response to and conditional upon satisfaction of predefined removal criteria that specify one or more of:

transgression of a player number threshold indicating a minimum number of players to whom the second player provides the received asset for satisfaction of the predefined removal criteria;

transgression of a transfer number threshold indicating a minimum number of instances of the received asset provided to other players by the second player for satisfaction of the predefined removal criteria; and a threshold time indicating a maximum period within which transgression of the player number threshold and/or of the transfer number threshold is to occur for satisfaction of the predefined removal criteria;

in response to and conditional upon provision of the received asset to the first player, automatically generating in the game interface of the first player a receipt notification with respect to the received asset, the receipt notification having embedded therein a gifting UI element that presents to the first player an option to gift a game asset to the second player;

receiving from the game interface of the first player user input indicating selection of the gifting UI element; and responsive to selection of the embedded gifting UI element in the game interface of the first player, providing to the second player a gifted asset sourced from the asset inventory of the first player, the asset inventory of the second player being updated to include therein the gifted asset.

2. The method of claim 1, wherein the preceding non-gameplay interaction comprises transfer of the gifted asset from the second player in direct response to an asset request broadcast by the first player via the game interface, the asset request soliciting gifting to the first player of a particular type of game asset.

3. The method of claim 2, further including prior operations comprising:

responsive to the asset request by the first player, causing display of an asset request notification in the game interface generated on a respective client device of the second player, the asset request notification comprising:

identification of the first player making the asset request;

identification of the particular type of game asset requested; and a response element that is embedded in the asset request notification and is configured to enable positive response to the asset request by interaction with the asset request notification, wherein the direct response of the second player to the asset request comprises selection by the second player of the response element in the asset request notification.

4. The method of claim 3, wherein the game interface includes:

a game area in which a relevant game instance is displayed and via which gameplay actions are controlled by the associated player; and a web feed portion separate from the game area, the request notification being displayed in the web feed portion.

5. The method of claim 1, the asset inventory of the second player is unaffected by provision of the received asset to the first player.

6. The method of claim 1, further comprising:

in the game interface of the first player, causing display of a composite notification that comprises a plurality of receipt notifications indicating respective assets received from a corresponding plurality of different players, each receipt notification within composite notification comprising a respective embedded response element selectable to trigger reciprocal asset gifting from the first player to the respectively associated other player, wherein the receipt notification for the received asset from the second player is displayed as a component of the composite notification.

7. The method of claim 6, further comprising:

identifying received assets sourced from other players while the first player was offline; and including in the composite notification a respective receipt notification for each such identified received asset, so that the composite notification depicts a summary of assets received while the second player was offline.

8. A system comprising:

one or more computer processor devices; and memory storing instructions that, when executed by the one or more computer processor devices, configure the system to perform operations comprising:

at a server system supporting a gaming platform for a computer-implemented online game, managing respective game state data for multiple players who access the game via a game interface generated on a respectively associated client device for each player, the game state data including, for each player, a respective asset inventory that indicates game assets available to the respective player during gameplay;

as a result of a preceding non-gameplay interaction between a first player and a second player via the game interface of the first player, providing to the first player a received asset sourced from the second player, the asset inventory of the first player being updated to include therein the received asset and the asset inventory of the second player being updated to remove therefrom the received asset, so that the received asset is effectively transferred from the asset inventory of the second player to the asset inventory of the first player, wherein removal of the received asset from the asset inventory of the second player is in response to and conditional upon satisfaction of predefined removal criteria that specify one or more of:

transgression of a player number threshold indicating a minimum number of players to whom the second player provides the received asset for satisfaction of the predefined removal criteria;

transgression of a transfer number threshold indicating a minimum number of instances of the received asset provided to other players by the second player for satisfaction of the predefined removal criteria; and a threshold time indicating a maximum period within which transgression of the player number threshold and/or of the transfer number threshold is to occur for satisfaction of the predefined removal criteria;

in response to and conditional upon provision of the received asset to the first player, automatically generating in the game interface of the first player a receipt notification with respect to the received asset, the receipt notification having embedded therein a gifting UI element that presents to the first player an option to gift a game asset to the second player;

receiving from the game interface of the first player user input indicating selection of the gifting UI element; and responsive to selection of the embedded gifting UI element in the game interface of the first player, providing to the second player a gifted asset sourced from the asset inventory of the first player, the asset inventory of the second player being updated to include therein the gifted asset.

9. The system of claim 8, wherein the preceding non-gameplay interaction comprises transfer of the gifted asset from the second player in direct response to an asset request broadcast by the first player via the game interface, the asset request soliciting gifting to the first player of a particular type of game asset.

10. The system of claim 9, wherein the instructions further configure the system to perform prior operation of, responsive to the asset request by the first player, causing display of an asset request notification in the game interface generated on a respective client device of the second player, the asset request notification comprising:

identification of the first player making the asset request;

identification of the particular type of game asset requested; and a response element that is embedded in the asset request notification and is configured to enable positive response to the asset request by interaction with the asset request notification, wherein the direct response of the second player to the asset request comprises selection by the second player of the response element in the asset request notification.

11. The system of claim 10, wherein the instructions configure the system to generate the game interface includes such that the game interface comprises:

a game area in which a relevant game instance is displayed and via which gameplay actions are controlled by the associated player; and a web feed portion separate from the game area, the request notification being displayed in the web feed portion.

12. The system of claim 8, wherein the instructions configure the system to provide the received asset to the first player without affecting the asset inventory of the second player.

13. The system of claim 8, wherein the instructions configure the system to perform further operations comprising:

in the game interface of the first player, causing display of a composite notification that comprises a plurality of receipt notifications indicating respective assets received from a corresponding plurality of different players, each receipt notification within composite notification comprising a respective embedded response element selectable to trigger reciprocal asset gifting from the first player to the respectively associated other player, wherein the receipt notification for the received asset from the second player is displayed as a component of the composite notification.

14. The system of claim 13, wherein the instructions configure the system to perform further operations comprising:

identifying received assets sourced from other players while the first player was offline; and including in the composite notification a respective receipt notification for each such identified received asset, so that the composite notification depicts a summary of assets received while the second player was offline.

15. A non-transitory computer-readable storage medium having stored thereon instructions that, when executed by a computer system, cause the computer system to perform operations comprising:

at a server system supporting a gaming platform for a computer-implemented online game, managing respective game state data for multiple players who access the game via a game interface generated on a respectively associated client device for each player, the game state data including, for each player, a respective asset inventory that indicates game assets available to the respective player during gameplay;

as a result of a preceding non-gameplay interaction between a first player and a second player via the game interface of the first player, providing to the first player a received asset sourced from the second player, the asset inventory of the first player being updated to include therein the received asset and the asset inventory of the second player being updated to remove therefrom the received asset, so that the received asset is effectively transferred from the asset inventory of the second player to the asset inventory of the first player, wherein removal of the received asset from the asset inventory of the second player is in response to and conditional upon satisfaction of predefined removal criteria that specify one or more of:

transgression of a player number threshold indicating a minimum number of players to whom the second player provides the received asset for satisfaction of the predefined removal criteria;

transgression of a transfer number threshold indicating a minimum number of instances of the received asset provided to other players by the second player for satisfaction of the predefined removal criteria; and a threshold time indicating a maximum period within which transgression of the player number threshold and/or of the transfer number threshold is to occur for satisfaction of the predefined removal criteria;

in response to and conditional upon provision of the received asset to the first player, automatically generating in the game interface of the first player a receipt notification with respect to the received asset, the receipt notification having embedded therein a gifting UI element that presents to the first player an option to gift a game asset to the second player;

receiving from the game interface of the first player user input indicating selection of the gifting UI element; and responsive to selection of the embedded gifting UI element in the game interface of the first player, providing to the second player a gifted asset sourced from the asset inventory of the first player, the asset inventory of the second player being updated to include therein the gifted asset.

\* \* \* \* \*